United States Patent [19]
Glenn

[11] Patent Number: 5,978,023
[45] Date of Patent: Nov. 2, 1999

[54] COLOR VIDEO CAMERA SYSTEM AND METHOD FOR GENERATING COLOR VIDEO SIGNALS AT INCREASED LINE AND/OR FRAME RATES

[75] Inventor: William E. Glenn, Ft. Lauderdale, Fla.

[73] Assignee: Florida Atlantic University, Boca Raton, Fla.

[21] Appl. No.: 08/814,954

[22] Filed: Mar. 10, 1997

Related U.S. Application Data

[60] Provisional application No. 60/028,443, Oct. 10, 1996.

[51] Int. Cl.⁶ ....................................................... H04N 9/68
[52] U.S. Cl. ............................................. 348/234; 348/273
[58] Field of Search ..................................... 348/234, 235, 348/238, 262, 263, 272, 273, 659, 660, 661, 335, 342, 236, 708; 359/838, 839, 629, 634, 639, 640; H04N 9/68

[56] References Cited

U.S. PATENT DOCUMENTS

| | | |
|---|---|---|
| 4,149,182 | 4/1979 | Yamanaka et al. . |
| 4,636,857 | 1/1987 | Achiha et al. . |
| 4,652,909 | 3/1987 | Glenn . |
| 4,667,226 | 5/1987 | Glenn . |
| 4,701,783 | 10/1987 | Glenn . |
| 4,733,299 | 3/1988 | Glenn . |

(List continued on next page.)

OTHER PUBLICATIONS

W.E. Glenn, K.G. Glenn, and T.L. Glatt, "Logarithmic A/D Converters Used in Video Signal Processing Systems," presented at the 132nd SMTE Technical Conference, New York, Oct. 1990. Reprinted in SMPTE Journal vol. 101/5:329–333, May 1992.

D.C. Livingston, "Colorimetric Analysis of the NTSC Color Television System," Proceedings of the IRE, 42:138–150, Jan. 1054.

Yuichi Ninomiya, et al., "An HDTV Broadcasting System Utilizing a Bandwidth Compression Technique–MUSE," IEEE Transactions on Broadcasting, vol. BC–33/4:130–160, Dec. 1987.

W.E. Glenn, Digital Image Compression Based On Visual Perception, *Digital Images& Human Vision*, edited by Andrew B. Watson, (Cambridge: MIT Press, 1993):63–71.

V.A. Billock and T.H. Harding, The Number and Tuning of Channels Responsible for the Independent Detection of Temporal Modulation, ARVO, Investigative Ophthalomology & Visual Sicnec, Annual Meeting Abstracts, 32:840, Mar. 15, 1991.

W.E. Glenn, "Digital Image Compression Based on Visual Perception And Scene Properties", Presented at the 133rd SMPTE Technical Conference in Los Angeles on Oct. 27, 1991, and published in the May, 1993, SMPTE Journal.

Glenn et al. "Subband Coding Compression System For Program Production", presented at the 136th SMPTE Technical Conference in Los Angeles, CA in Oct. 1994.

Glenn et al. "Simple Scalable Video Compression Using 3–D Subband Coding", presented at the SMPTE Advanced Television and Electronic Imaging Conference in San Francisco, CA on Feb. 11, 1995, and published in the Mar. 1996 SMPTE Journal.

*Primary Examiner*—Tuan V. Ho
*Attorney, Agent, or Firm*—Martin M. Novack

[57] ABSTRACT

A method and apparatus is disclosed for generating video signals representative of color images of a scene. An embodiment of the method includes the following steps: deriving a luminance signal representative of the scene at a first frame rate; deriving color component signals representative of the scene at a first line rate; generating, from the luminance signal, a converted luminance signal comprising the high spatial frequency portion of the luminance signal at a second frame rate higher than the first frame rate; generating, from the color component signals, converted color component signals at a second line rate higher than the first line rate; and combining the converted luminance component signal and at least one of the converted color component signals.

21 Claims, 5 Drawing Sheets

U.S. PATENT DOCUMENTS 4,823,186   4/1989   Muramatsu .
4,876,591  10/1989   Muramatsu .
5,025,394   6/1991   Parke .
5,221,963   6/1993   Hashimoto et al. .................... 348/234
5,325,125   6/1994   Naimpally et al. .
5,414,465   5/1995   Kodama et al. ........................ 348/236
5,568,193  10/1996   Kawahara ............................... 348/222

COLOR VIDEO CAMERA SYSTEM AND METHOD FOR GENERATING COLOR VIDEO SIGNALS AT INCREASED LINE AND/ OR FRAME RATES

This application claims priority from U.S. Provisional Application No. 60/028,443, filed Oct. 10, 1996.

FIELD OF THE INVENTION

This invention relates to producing television signals and, more particularly, to an improved method and apparatus, such as a high definition color video camera system, for producing electronic video signals representative of a scene.

BACKGROUND OF THE INVENTION

Color television camera systems have evolved over the years, but a recent challenge has been to develop a practical high definition television camera with improved performance that can overcome limitations of existing solid state image sensor (e.g. CCD) technology.

It is known that an electronic video signal (television signal) can be encoded at reduced bandwidth by lowering the frame refresh rate of the high spatial frequency components, while maintaining the frame refresh rate of at least a portion of the low spatial frequency components at the standard rate. If done in a particular manner, this will not cause substantial degradation in the ultimately displayed image, since human vision cannot perceive changes in high spatial resolution information at as fast a rate as it can perceive changes in low spatial resolution information. Accordingly, as has been previously set forth, an electronic video encoding and decoding system can be devised which takes advantage of this, and other, characteristics of human vision by encoding higher spatial resolution video components to be at a temporal information rate which approximately corresponds to the highest rate actually perceived by human vision for such components; thereby eliminating the need to encode these components at a higher rate, which inherently wastes bandwidth.

The foregoing principle was used to advantage in my U.S. Pat. No. 4,652,909, which discloses a video camera system and method with a high definition capability. First and second video imaging devices are provided. Optical means are provided for directing light from the scene to both of the first and second video imaging devices, such that they receive substantially the same optical image. Means are provided for scanning the first video imaging device at a relatively fast scan rate, typically, but not necessarily, a conventional 30 frames per second. Means are also provided for scanning the second video imaging device at a relatively slow scan rate, preferably not greater than 15 frames per second. In this system, as indicated, the top octave (detail) information can be scanned at 15 frames per second and the other (lower spatial frequency) information scanned with a standard television camera at 30 interlaced frames per second.

Another prior art approach of interest is the four tube (or sensor) color camera. In this camera system, a fourth tube is used to derive luminance while the three other tubes in the camera derive the color information. All tubes were scanned interlaced at 30 frames per second.

Interlaced scanning was developed many years ago as a way of displaying images without flicker at a frame rate of 30 frames per second. The 1/60 second integration time on the face of the interlaced camera was short enough to prevent "motion blur" of moving objects. Interlace can be visualized as a form of subband coding compression. It updates low spatial frequency information at 60 fields per second but requires 1/30 second to produce detail. Because of the longer integration time of the human visual system for detail information, this system works reasonably well. However, it has several artifacts resulting from the "compression". One such artifact relates to the fact that the eye frequently scans vertically at the interlace "line crawl" velocity. During this time the field line structure is clearly visible and objects moving at that velocity are displayed with half as many scan lines. A more objectionable artifact is interline flicker. Detail information near the Nyquist limit of resolution produces a "moire" beat at low spatial frequencies that flickers at 30 Hz. The visual system has good temporal response for low spatial frequencies. For this reason, displays that have considerable information near the Nyquist limit of resolution (e.g. some computer displays) use progressive rather than interlaced scanning.

Interlace format has other recognized disadvantages. Interlace has been a difficult signal to process for compression systems and is a nuisance for electronic video post production. It has been a desire for the computer industry, compression researchers, and the post-production houses to have a video system that has square pixels, progressively scanned at a 1920×1080 common image format. Displays have long been able to display this format. For example, active-matrix LCD displays are addressed at 60 FPS progressively in order to get good motion rendition and high brightness. It is only the lack of a practical camera and recording device that has limited the transition to progressive scan in the common image format.

Image sensors have become available (e.g. Eastman Kodak KAI-2090 and KAI-2091) that have 1920×1080 square pixels, with a 16:9 aspect ratio, that can be scanned (interlaced or progressive) at 30 frames per second at 1080 visible lines per frame, or scanned (interlaced or progressive) at 60 frames per second, two lines at a time, to give 540 visible lines per frame. The problem, however, is that the sensors are not capable of being scanned at 60 frames per second and 1080 lines per frame.

It is among the objects of the present invention to provide a method and apparatus for generating color video signals at increased line and/or frame rates, and above the scanning capability of the sensors used, and preferably in progressive scan format, but without introducing artifacts when images are produced from the video signals. It is also among the objects of the present invention to provide an improved color video camera with a minimum of video sensors.

SUMMARY OF THE INVENTION

The present invention is directed to a method and apparatus for generating video signals representative of color images of a scene. An embodiment of the method of the invention includes the following steps: deriving a luminance signal representative of the scene at a first frame rate; deriving color component signals representative of the scene at a first line rate; generating, from the luminance signal, a converted luminance signal comprising the high spatial frequency portion of the luminance signal at a second frame rate higher than the first frame rate; generating, from the color component signals, converted color component signals at a second line rate higher than the first line rate; and combining the converted luminance component signal and at least one of the converted color component signals. [As used herein, unless otherwise specified, "line rate" means the number of lines per unit time.]

In one preferred embodiment of the invention the second frame rate is twice said first frame rate and the second line rate is twice the first line rate. In a form of this embodiment, the step of deriving color component signals includes deriving a plurality of color difference signals and a color-derived luminance signal, the step of generating converted color component signals comprises generating a plurality of converted color difference signals and a converted color-derived luminance signal at the second line rate, and the combining step comprises combining the converted luminance signal and the converted color-derived luminance signal.

The technique hereof can be used for example, to obtain progressively scanned output luminance and color signals at 60 frames per second, 1080 visible lines per frame [i.e., a line rate of 64,800 visible lines per second] using sensors capable of being driven at 32,400 visible lines per second [e.g. 30 frames per second, 1080 visible lines per frame, or, 60 frames per second, 540 visible lines per frame] that will not, upon display, exhibit the noticeable motion artifacts that would result from simple scan conversions to a higher frame and/or line rate.

Further features and advantages of the invention will become more readily apparent from the following detailed description when taken in conjunction with the accompanying drawings.

DETAILED DESCRIPTION

Figure 1:
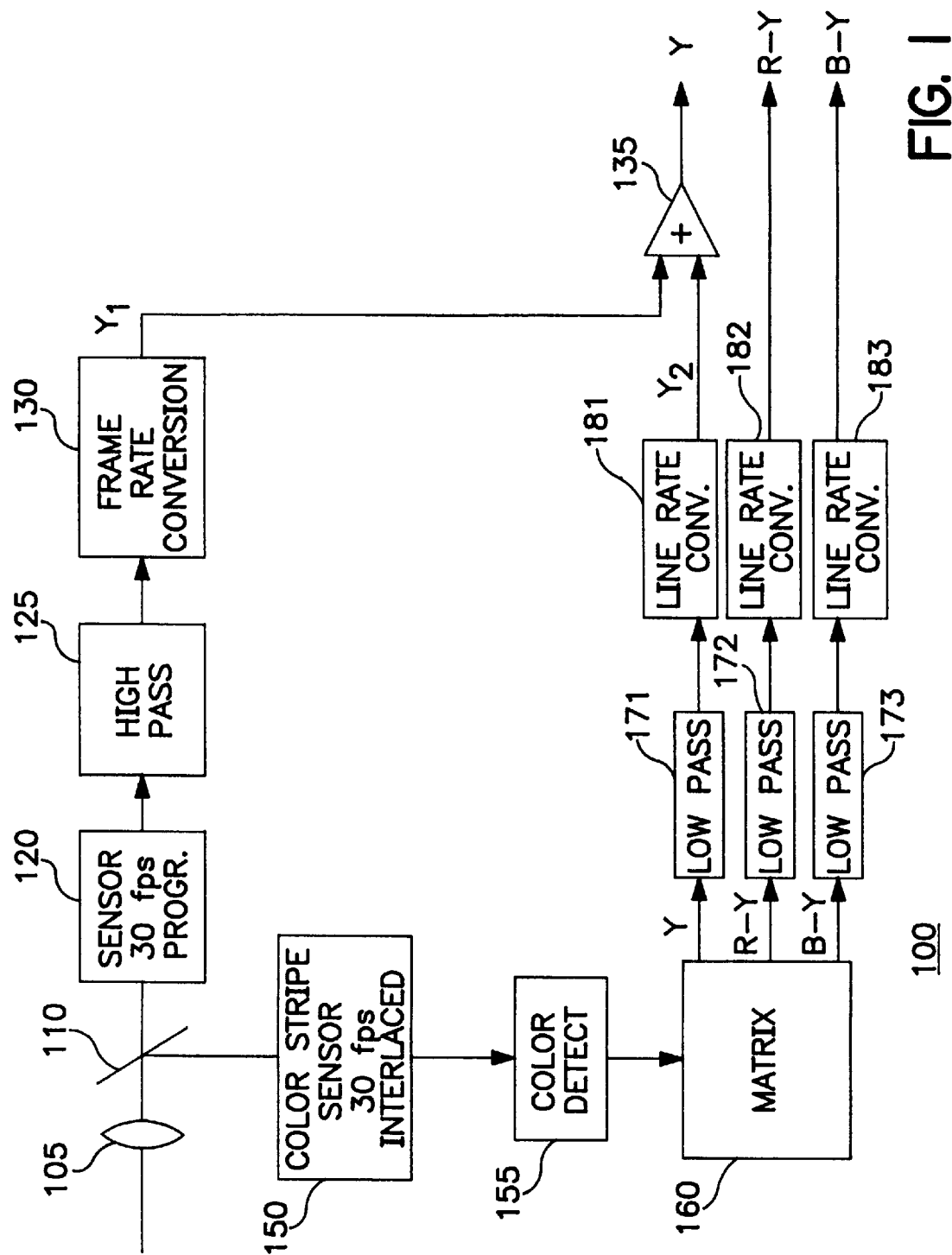
FIG. 1 is a diagram, partially in schematic and partially in block form, of an apparatus in accordance with an embodiment of the invention and which can be used in practicing an embodiment of the method of the invention.

Referring to FIG. 1 there is shown a block diagram of a video camera system 100 in accordance with an embodiment of the apparatus of the invention and which can be used in practicing an embodiment of the method of the invention. Light received from a scene being viewed (i.e., a scene which can be moving) is focused by a camera lens system, represented at 105, through a splitter, e.g. a half-silvered mirror 110, onto image sensors 120 and 150, respectively.

Figure 3:
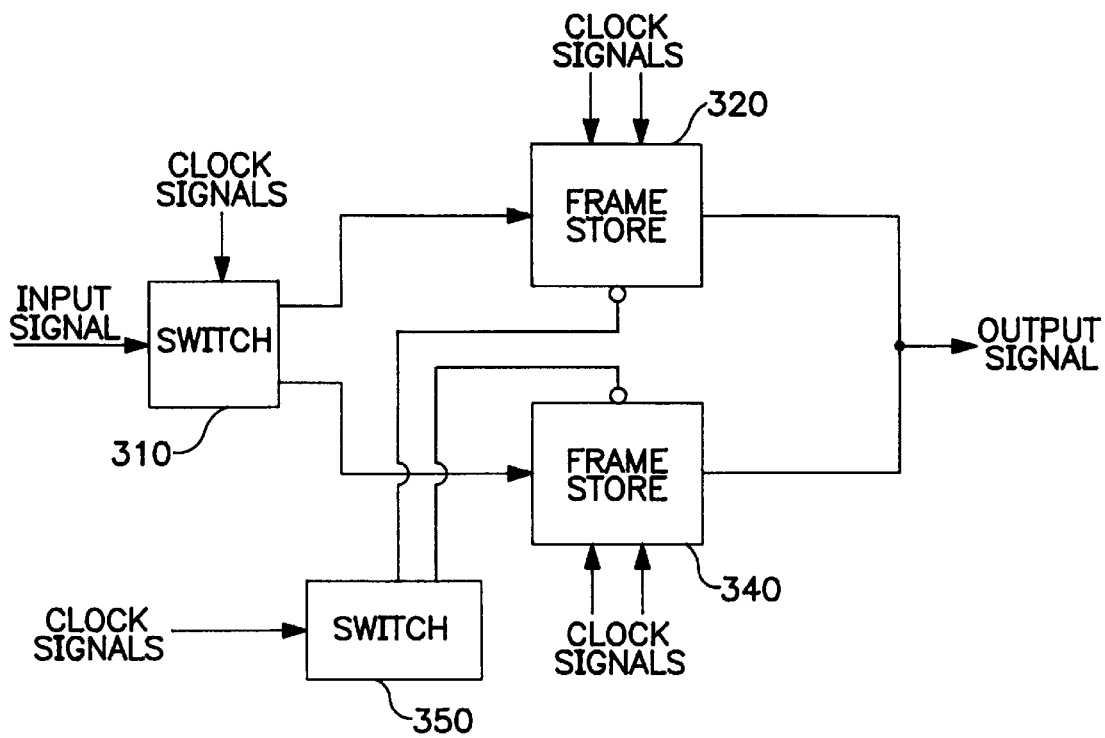
FIG. 3 is a block diagram of a type of circuit that can be used for frame rate conversion in an embodiment hereof.

The sensor 120, which may be, for example, a Kodak CCD sensor of the type first mentioned above having 1080 lines and 1920 pixels per line, is progressively scanned at 30 frames per second in this embodiment. The output of CCD sensor 120 is coupled to a high pass spatial filter 125, the output of which is coupled to a frame rate conversion circuit 130. It is known, in general, that a frame of video information can be digitized and clocked in at one rate (e.g. 30 frames per second, in the example of the present embodiment) and clocked out at a higher rate (e.g. 60 frames per second, in the example of the present embodiment) by using frame stores that clock out at twice the rate at which they are clocked in, with each original frame being clocked out twice during one original frame period. FIG. 3 illustrates the type of circuit that can be employed. Reference can also be made to my U.S. Pat. No. 4,701,783. In the present embodiment, the line rate of the converted frames will be 1080 visible lines per frame times 60 frames per second, which equals 64,800 visible lines per second. [The full line rate for this case will be 1125 lines per frame, which gives 67,500 total lines per second.] The output of the frame rate conversion circuit 130, designated $Y_1$, is coupled to one input of a summing circuit 135.

The other sensor 150 of the FIG. 1 embodiment may be, for example, another CCD sensor, having the same 1920 by 1080 pixel and line structure, but operated with color stripes, as is known in the art for producing color component signals, and which is also available, for example, from Eastman Kodak. In the embodiment of FIG. 1, the sensor 150 is operated to be scanned at 30 interlaced frames per second. The output of sensor 150 is coupled to the block 155 and then block 160, which respectively represent conventional types of circuits for color detection (block 155) and for generating luminance and color difference signals (the matrix of block 160). The outputs of matrix circuit 160, in the present embodiment, are a luminance signal, designated $Y_2$, and color difference signals designated $R-Y_2$ and $B-Y_2$. Each of these signals is coupled to a respective low-pass spatial filter, the filters being respectfully designated 171, 172 and 173. The outputs of the low-pass spatial filters are coupled to respective line rate conversion circuits 181, 182 and 183, which are described in further detail in conjunction with FIG. 4. In the present embodiment, each line is clocked out at twice its original rate for two successive lines, so the result will be 60 progressive frames of 1080 visible lines each; i.e., again a line rate of 64,800 visible lines per second (and a full line rate of 67,500 lines per second). [In this and other embodiments, it will be understood that there must be a line reverse to account for the mirror image resulting from mirror 110. If this is not implemented by reading out the sensor lines in reverse order, it can be readily performed by clocking out on a last in first out basis in the line rate conversion circuit.] The output of line rate conversion circuit 181 is coupled to a second input of summing circuit 135 which produces an output luminance signal designated Y. The outputs of line rate conversion circuits 182 and 183 are respectively the color difference output signals $R-Y_2$ and $B-Y_2$.

In operation, it is seen that the described system and technique achieves the desired color video signals at the higher progressive scan rate (60 frames per second, progressive, in this example), at the full line capability of the sensors used, and without undue introduction of artifacts. In the output of the camera system, everything but the top octave of luminance detail is undated at 60 frames per second. The detail information is updated at 30 frames per second (as it is in interlaced scans, but without the interlace artifacts).

Figure 2:
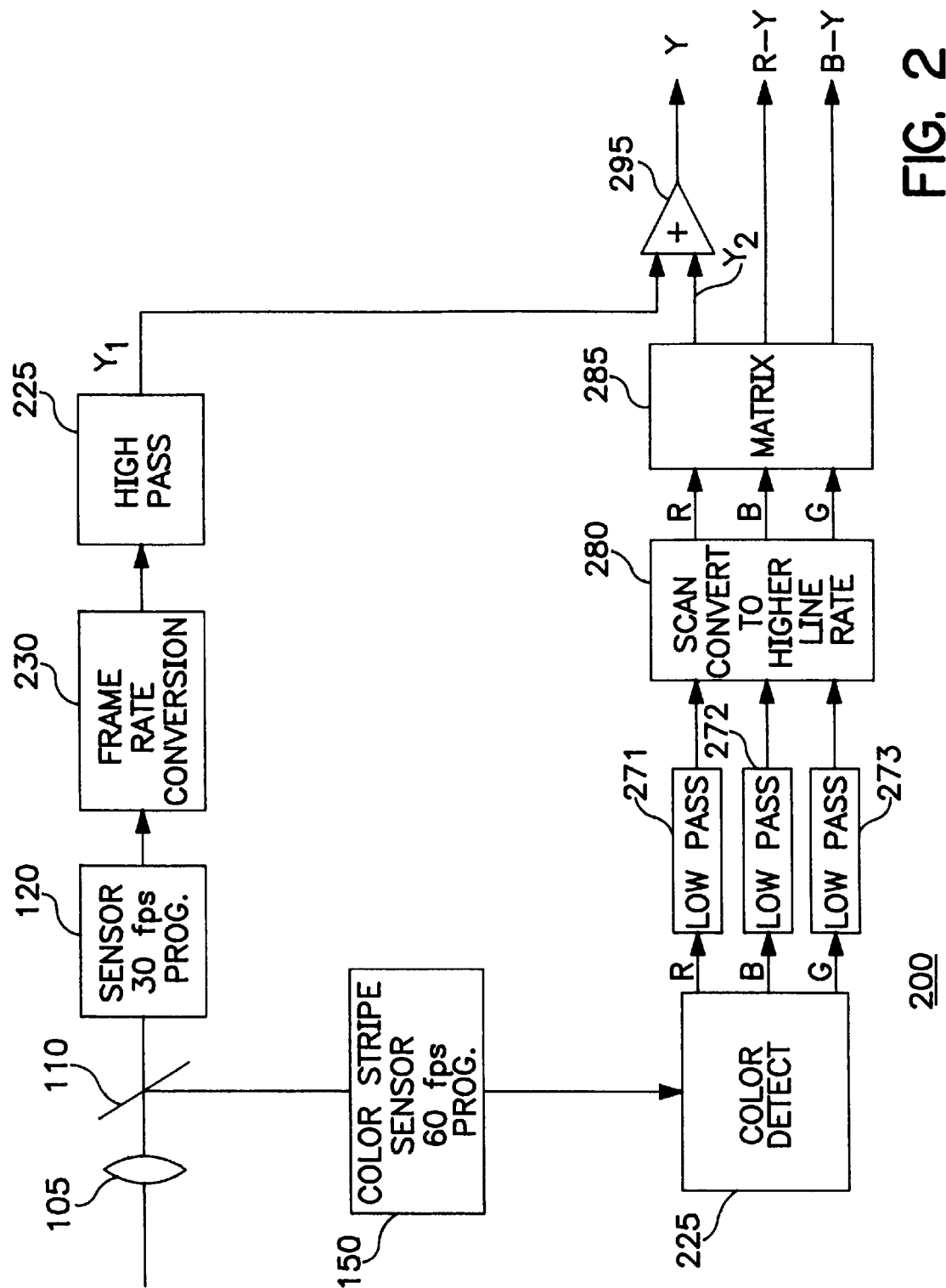
FIG. 2 is a diagram, partially in schematic and partially in block form, of an apparatus in accordance with another embodiment of the invention and which can be used in practicing another embodiment of the method of the invention.

Referring to FIG. 2, there is shown another embodiment of the invention. Conceptually, the system 200 of FIG. 2 is similar to the embodiment of FIG. 1. The lens system 105 and splitter 110 correspond to their counterparts in FIG. 1, and the image sensors 120 and 150 also correspond to their counterparts in FIG. 1. In the embodiment of FIG. 2 the sensor 120 is again operated at 30 frames per second, progressive, and the high spatial frequency band luminance signal is again generated from this signal, a minor variation being that in the embodiment of FIG. 2, the frame rate conversion (block 230) is implemented before the high pass spatial filtering (block 225), it being understood that either approach can be used in any embodiment, as preferred. [Another approach to band separation that can be used is to derive the high spatial frequency signal by generating and subtracting out in the luminance channel substantially the same low spatial frequency information that is used in the color-derived channel.] In the embodiment of FIG. 2, the color stripe image sensor 150 is operated at 60 frames per second, progressive, at 540 visible lines per frame (which is half the number of visible lines per frame of the FIG. 1 embodiment, but the same line rate of 32,400 visible lines per second (33,750 total lines per second). A conventional type of color detection circuit (block 255) is then employed, as before. In this embodiment, the color component signals, R, B, G, are low pass spatially filtered (blocks 271, 272, and 273, respectively) and then scan converted (block 280) to 1080 lines per frame, which can be done in the same manner as described in the FIG. 1 embodiment. As before, the resultant visible line rate will be 64,800 lines per second (corresponding to a total line rate of 67,500 lines per second). The filtered and converted color component signals can be matrixed (block 285), with the converted color-derived luminance $Y_2$ added (by adding circuit 295) to the converted high band luminance $Y_1$, as before. [Alternatively, appropriate proportions of the converted color component signals can be added to appropriate portions of the converted high band luminance to output color component signals in other desired formats.] The output signals, at 60 progressive frames per second, 1080 visible lines (1125 lines total) per frame can be, for example, transmitted, recorded, and or displayed.

FIG. 3 shows an example of a type of circuit that can be used for frame rate conversion in embodiments hereof. Two frames stores, designated 320 and 340, are provided. A switch 310 receives the input signal at the first (lower) frame rate, such as 30 frames per second. The switch is switched at the frame rate to couple the input signal alternately to frame stores 320 and 340. In the present embodiment the frame stores are clocked in at 30 frames per second and clocked out at 60 frames per second, with one frame store being clocked in while the other is being clocked out and then vice versa. The clocking out is performed twice (1/60 second duration each) for each original frame period (1/30 second). Enablement of the frame stores is controlled by another switch 350, which is clocked at the higher frame rate, and alternatively enables readout by each frame store successively for two 1/60 second periods.

Figure 4:
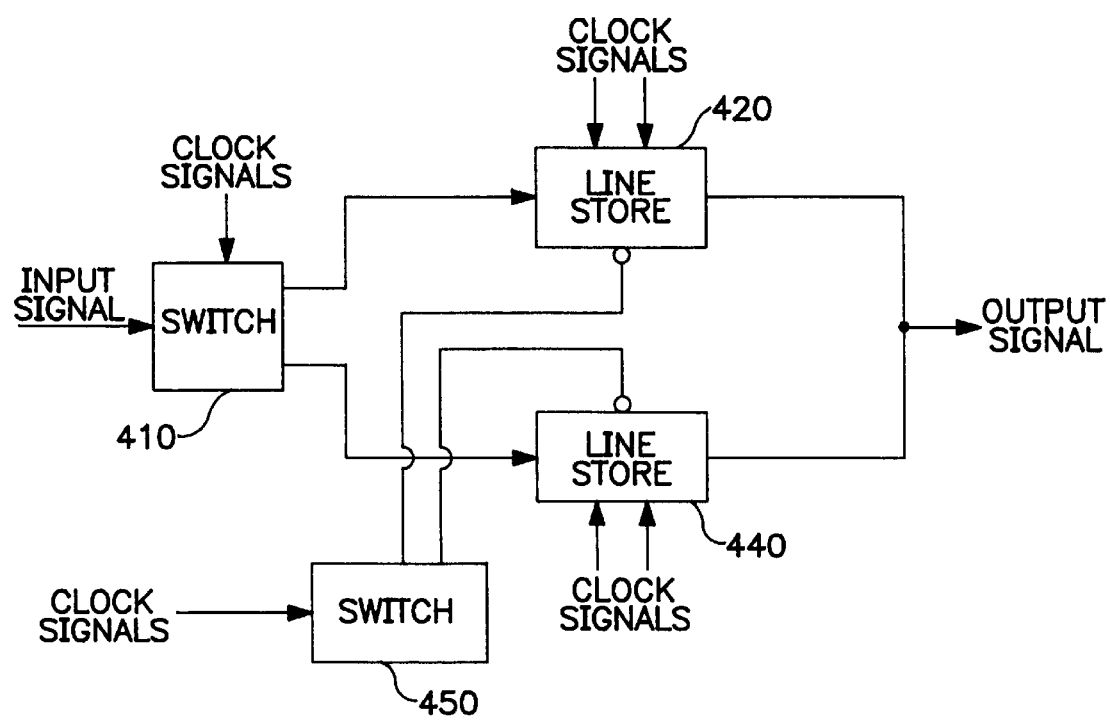
FIG. 4 is block diagram of a type of circuit that can be used for line rate conversion in an embodiment hereof.

FIG. 4 shows an example of a type of circuit that can be used for line rate conversion in embodiments hereof. The basic concept is similar to that of FIG. 3, but using a line basis instead of a frame basis. Two lines stores, designated 420 and 440, are provided. A switch 410 receives the input signal at the first (lower) line rate. The switch is switched at the line rate to couple the input signal alternately to line stores 420 and 440. The clocking out is performed twice for each original line period. Enablement of the line stores is controlled by another switch 450, which is clocked at the higher line rate, and alternatively enables readout by each line store successively for two of the higher rate line periods.

Figure 5:
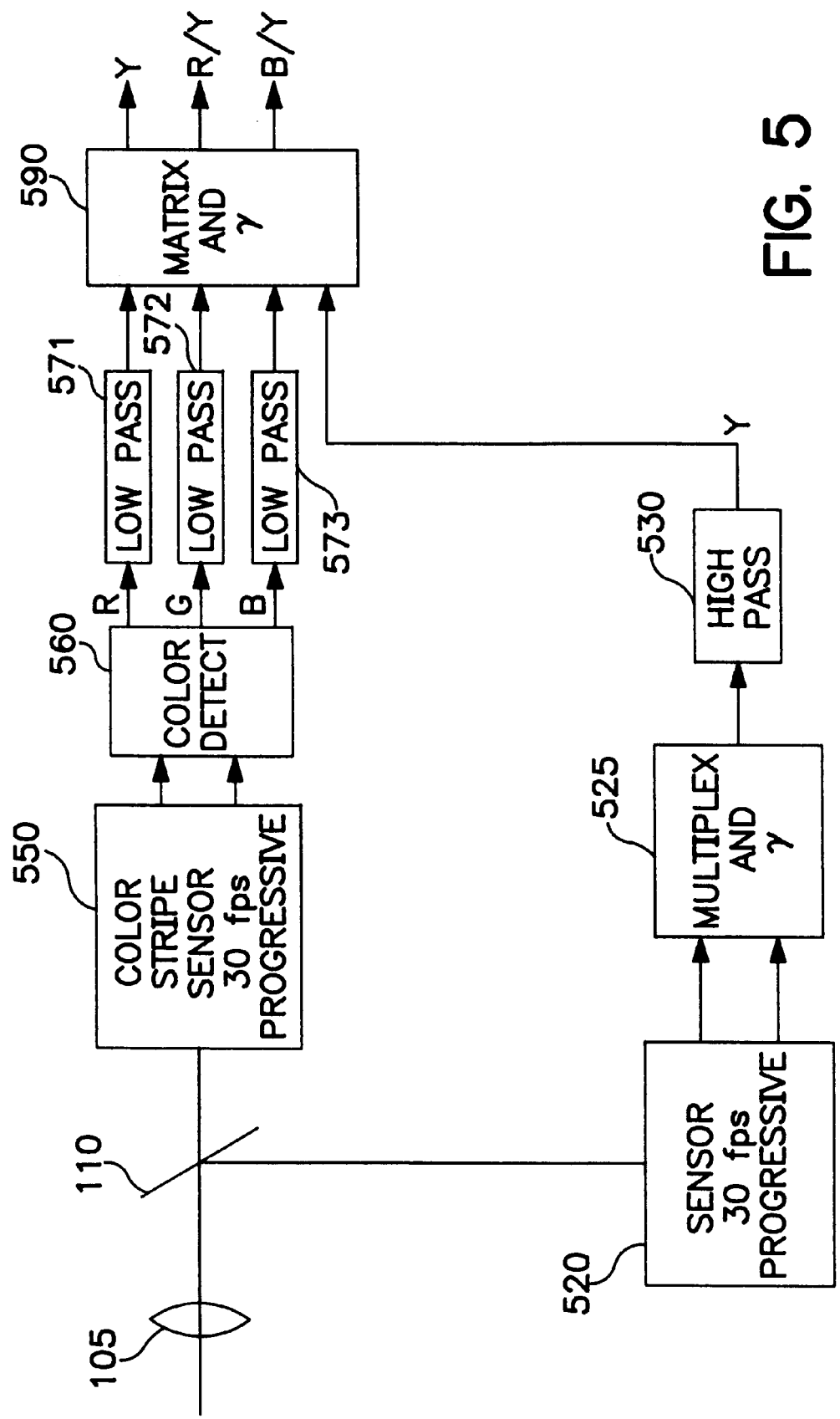
FIGS. 5 and 6 are diagrams, partially in block form, of further embodiments.

FIG. 5 illustrates an embodiment that is simpler and less expensive to implement, if some reduction in performance (e.g., frame rate) can be tolerated. As before, light received from a scene being viewed (i.e., a scene which can be moving) is focused by a camera lens system, represented at 105, through a splitter, e.g. a half-silvered mirror 110, onto two image sensor chips. In the embodiment of FIG. 5, the monochrome sensor 520 and the color sensor 550 (which, in this example, has conventional RGBG stripes) are each operated at 30 frames per second, progressive scan, with 1080 lines per frame. The sensors may, again, be of a type available from Eastman Kodak, and are each illustrated in this example as having two outputs (for the type of sensor chip in which pixels of a scanline are alternately output on a line pair). The output of the monochrome sensor can be multiplexed (to alternately select pixels from the two lines) and gamma corrected, as represented by block 525. The resultant luminance signal, Y, is high pass filtered (block 530) and coupled to block 590. The color sensor line pair output is coupled to color detection circuitry 560, which may be of conventional type, and which produces output signals, for this example, designated R, G, and B. The color components signals are low pass filtered by respective filters 571, 572 and 573 and then coupled with matrix and gamma correction circuitry 590 that operates to produce an output luminance signal Y and output isoluminant color ratio signals R/Y and B/Y. The circuit 590 also includes the appropriate gamma correction.

Figure 6:
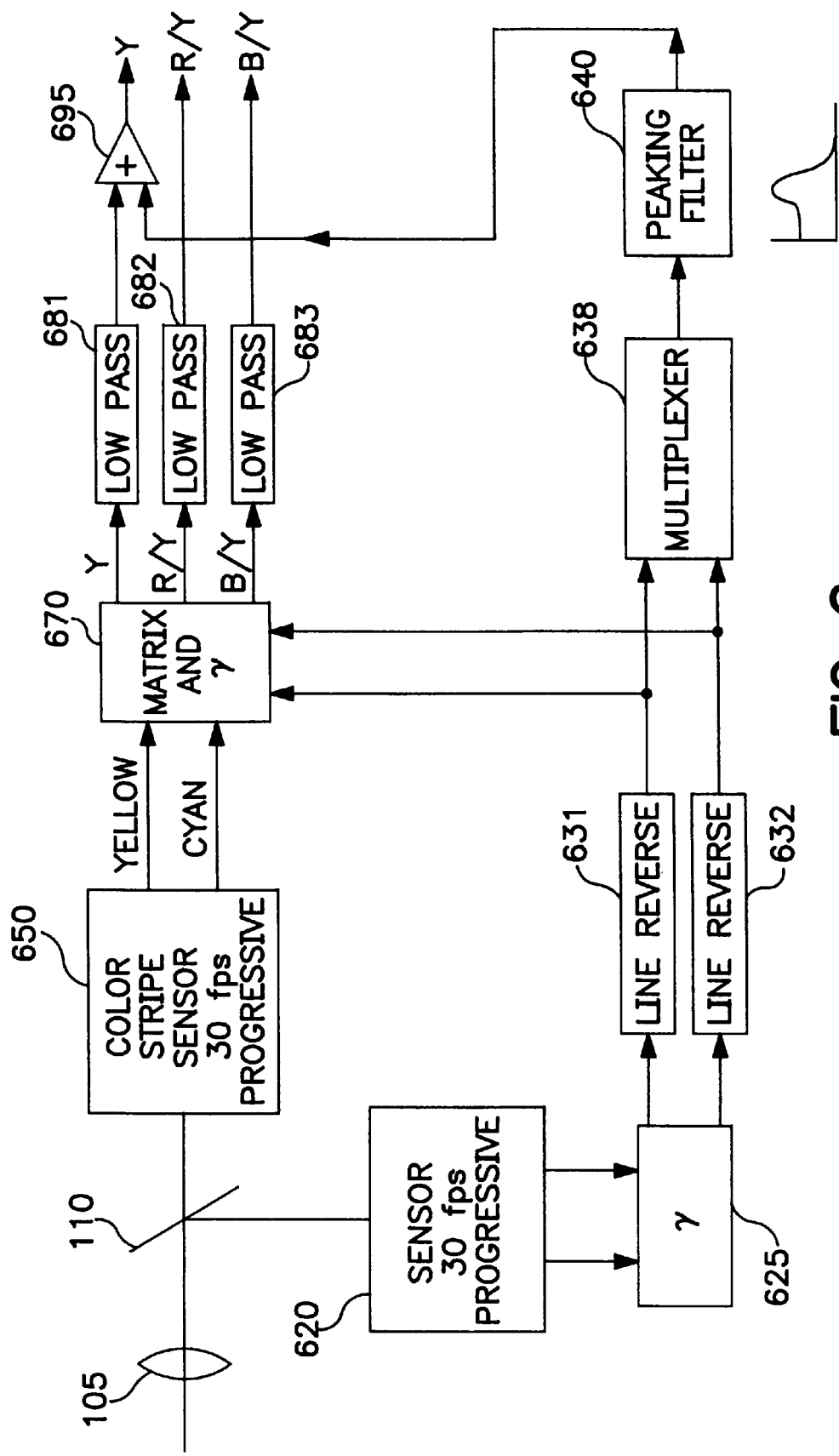

FIG. 6 illustrates another simplified embodiment which, like FIG. 5, uses monochrome and color stripe sensors (in this case, labeled 620 and 650, respectively), each of which is operated in this example at 30 frames per second, progressive scan, at 1080 lines per frame. The monochrome sensor outputs are gamma corrected (block 625). Once again, the channel that is a mirror image would be line reversed (specifically shown here), either by reading the lines out of the sensor chip in reverse or by implementing a suitable line reverse function e.g. by reading out of line stores (631 and 632) in last-in first-out fashion. The outputs of the line reverse circuits are coupled to the block 670 and are also coupled, via multiplexer 638 (which operates to select alternating pixels from the input lines), and peaking filter 640, to one input of a summing circuit 695. In the present embodiment, the peaking filter 640 has a characteristic as sketched next to the block in the figure. It is seen to pass part of the lower frequencies and to peak in the higher frequencies. In the color channel, the color sensor of the FIG. 6 embodiment is provided with yellow and cyan stripes. Other two color stripes, for example blue and red stripes, can be used on the color sensor. The color outputs are coupled to matrix and gamma correction circuitry 670 which also receives the luminance component from the monochrome channel, and is operative to produce the derived luminance signal, Y, and the isoluminant color ratio signals R/Y and B/Y. These signals are low pass filtered by respective filters 681, 682 and 683. The low-pass filtered color-derived luminance signal is combined with the filtered monochrome-derived luminance component in the summing circuit 675, thereby producing the output luminance signal.

There are several options for the two-sensor cameras hereof. These options depend somewhat on the application intended for the signals. Consider first a single sensor camera with R, G, B, G color stripe filters (as in the prior art). If this is used to produce R, G, B signals the G resolution is half the horizontal resolution of the unfiltered sensor, and both B and R signals are ¼ this resolution. The derived Y signal (0.3R+0.6G+0.1B) uses ½ of the light for G and ¼ of the light for R and B. Therefore, the total visibility of noise is (0.6)×(2)+(0.1)×(4)+(0.3)×(4) or 2.8 times what it would be if a three-chip color camera was built with three sensors without stripe filters.

Next consider two-chip cameras as herein. A first option is to use a sensor with RGBG stripes to detect color and another one without stripes to detect luminance. If the light is split ⅓ luminance and ⅔ to the color sensor, the luminance S/N ratio for Y will be about the same as that of the single sensor camera and the S/N ratio for Y will be about the same as that of the single sensor camera and the S/N for color will be ⅔ in comparison. In this case if isoluminant color is derived from the color sensor a derived R, G, B image will have full luminance resolution for all three colors. Changes in color will have half resolution for G/Y and ¼ resolution for B/Y and R/Y. Since the Y sensor does not have the correct spectral distribution, this must be handled as described below.

Next consider a color sensor in which the stripes are yellow and cyan alternating, as in FIG. 6 above. Ideally, an optical anti-aliasing filter can be used with this which has half the resolution horizontally as vertically. In this case one can divert 83% of the blue light and 50% of the red light to the color sensor (e.g. by using dichroic optics in the above embodiments). This gives the Y sensor a 0.3, 0.6, 0.1 spectral distribution since the sensor itself has ⅔ the red sensitivity as G and B. The color sensor will now detect R and B at half resolution. From this R/Y and B/Y can be derived from the two sensors. Y will have full resolution and R/Y and B/Y will have half resolution horizontally. The noise in the Y sensor will be 1.6 times the noise of a three-sensor camera.

A further version splits the light 50:50 for all colors and uses yellow-cyan alternating stripes on the color sensor (as in FIG. 6 above). Green is detected on all pixels of both sensors. R is the difference between the cyan pixel and the Y sensor same pixel. B is the difference between the yellow pixel and its corresponding Y pixel. The Y information can be derived from the sum of the two sensor outputs. For the cyan pixel a red signal needs to be added to the sum and for the yellow pixel a blue signal is added to the sum. In this way every pixel has the same output regardless of color. The Y signal, however, does not have the correct spectral distribution. This can either be corrected by preceding the camera with a filter that absorbs 83% of blue and 50% of red, or by correcting Y dynamically with the color information, i.e., if the normalized (white) signal is all blue it multiplies Y by 0.1, 0.6 for green, 0.3 for red, 1.0 for white, etc. Alternatively, R, G, B signals can be put out in which G has full resolution, R has half resolution, and B has half resolution. In this last case the noise level for the resulting Y is 1.4 times that of a three-chip camera. Its S/N ratio is double that of a single chip camera.

In the computations on the above camera configurations, it was assumed that both sensors are using the same scan format. This can be, for example, interlaced at 30 frames per second or progressive at 30 or 24 frames per second. If progressive scan is used it is usually advisable to use an electronic shutter at 1/60 second exposure (at a 2:1 loss in sensitivity) whenever scenes have rapid motion in order to reduce motion blur.

In a camera it has been verified both theoretically and experimentally that the top octave of detail luminance and all isoluminant color can be integrated for 1/30 second without visible motion blur. The various forms of the two chip camera can take advantage of this to get better sensitivity. The color camera with R G B G stripes can integrate for 1/30 second in the color sensor for deriving color signals even if an electronic shutter is used for the Y sensor. Alternatively, detail luminance can be derived from the Y sensor and everything else from the color sensor scanned at 60 frames per second but having the color signals integrated electrically with frame stores to 1/30 second exposure.

For the camera in which the light is split 50:50, and the color camera has yellow-cyan alternating filters, the Y camera can be scanned progressively at 30 frames per second. The color sensor can be scanned progressively at 60 frames per second two lines at a time. The same two lines can be added together for the Y sensor and two fields can be added together for the color sensor to derive B and R signals by subtracting the resulting signals yellow and cyan from Y. The Y sensor at full resolution can be used to derive detail Y. Detail Y can be obtained from the Y sensor by subtracting the 4-pixel cluster sum from the entire signal that is used for the low resolution Y. A 4-pixel cluster (yellow+cyan) at 60 frames per second can be used to provide low resolution Y. For making R-Y and B-Y, 1/30 second Y can be obtained by adding two fields of the 1/30 second Y. The spectral distribution of both Y signals is incorrect and can be corrected by the adaptive process discussed above.

I claim:

1. A method for generating video signals representative of color images of a scene, comprising the steps of:
    deriving a luminance signal representative of said scene at a first frame rate;
    deriving color component signals representative of said scene at a first line rate;
    generating, from said luminance signal, a converted luminance signal comprising the high spatial frequency portion of said luminance signal at a second frame rate higher than said first frame rate;
    generating, from said color component signals, converted color component signals at a second line rate higher than said first line rate; and
    combining the converted luminance component signal and at least one of the converted color component signals.

2. The method as defined by claim 1, wherein said at least one of the converted color component signals comprises at least one low pass filtered converted color component signal.

3. The method as defined by claim 1, wherein said second frame rate is twice said first frame rate.

4. The method as defined by claim 3, wherein said second line rate is twice said first line rate.

5. The method as defined by claim 4, wherein said first frame rate is 30 frames per second, and wherein said second frame rate is 60 frames per second.

6. The method as defined by claim 1, wherein said step of deriving color component signals includes deriving a plurality of color difference signals and a color-derived luminance signal, and wherein said step of generating converted color component signals comprises generating a plurality of converted color difference signals and a converted color-derived luminance signal at said second line rate; and wherein said combining step comprises combining said converted luminance signal and said converted color-derived luminance signal.

7. The method as defined by claim 1, wherein said second line rate corresponds to the line rate of said converted luminance signal.

8. The method as defined by claim 1, wherein said step of generating a converted luminance component signal includes high pass filtering said luminance signal and then converting said filtered luminance signal to said second frame rate.

9. The method as defined by claim 1, wherein said step of generating a converted luminance signal includes converting said luminance signal to said second frame rate, and then high pass filtering.

10. The method as defined by claim 1, wherein said converted luminance signal and said converted color component signals are in progressive scan format.

11. The method as defined by claim 10, wherein said color component signals are in interlaced format and said converted color component signals are in progressive scan format.

12. Apparatus for generating video signals representative of color images of a scene, comprising:

means for deriving a luminance signal representative of said scene at a first frame rate;

means for deriving color component signals representative of said scene at a first line rate;

means for generating, from said luminance signal, a converted luminance signal comprising the high spatial frequency portion of said luminance signal at a second frame rate higher than said first frame rate;

means for generating, from said color component signals, converted color component signals at a second line rate higher than said first line rate; and means for combining the converted luminance component signal and at least one of the converted color component signals.

13. Apparatus The method as defined by claim 12, wherein said second frame rate is twice said first frame rate.

14. Apparatus as defined by claim 13, wherein said first frame rate is 30 frames per second, and wherein said second frame rate is 60 frames per second.

15. Apparatus as defined by claim 12, wherein said means for deriving color component signals includes means for deriving a plurality of color difference signals and a color-derived luminance signal, and wherein said means for generating converted color component signals comprises means for generating a plurality of converted color difference signals and a converted color-derived luminance signal at said second line rate; and wherein said combining means comprises means for combining said converted luminance signal and said converted color-derived luminance signal.

16. Apparatus as defined by claim 12, wherein said means for generating a converted luminance component signal includes means for high pass filtering said luminance signal and then converting said filtered luminance signal to said second frame rate.

17. Apparatus as defined by claim 12, wherein said means for generating a converted luminance signal includes means for converting said luminance signal to said second frame rate, and then high pass filtering.

18. Apparatus as defined by claim 12, wherein said means for deriving a luminance signal comprises a first video sensor chip, and wherein said means for deriving color component signals comprises a second video sensor chip having color stripes of only two colors.

19. Apparatus as defined by claim 18, wherein the two colors of said color stripes on said second video sensor chip are yellow and cyan.

20. A method for generating video signals representative of color images of a scene, comprising the steps of:

deriving a luminance signal representative of said scene at a progressively scanned frame rate of 30 frames per second;

deriving color component signals representative of said scene at a first line rate;

generating, from said luminance signal, a converted luminance signal comprising the high spatial frequency portion of said luminance signal at a progressively scanned frame rate of 60 frames per second;

generating, from said color component signals, converted color component signals at a frame rate of 60 frames per second and a second line rate that is twice said first line rate; and combining the converted luminance component signal and at least one of the converted color component signals.

21. Apparatus for generating video signals representative of color images of a scene, comprising:

a first video sensor chip;

a second video sensor chip having color stripes;

means for dividing light from said scene between said first and second sensor chips;

means for deriving a luminance component signal from said first video sensor chip;

means for deriving color component signals from said second video sensor chip;

means for low pass filtering said color component signals; and means for combining said luminance component signal and said filtered color component signals to obtain isoluminant output color video component signals.

* * * * *